(12) United States Patent
Yadav et al.

(10) Patent No.: US 10,226,063 B2
(45) Date of Patent: Mar. 12, 2019

(54) METHODS OF DECREASING THE VISCOSITY OF A DIETARY FIBER

(71) Applicants: The United States of America, as Represented by the Secretary of Agriculture, Washington, DC (US); AgriFiber Solutions, LLC, Mundelein, IL (US)

(72) Inventors: Madhav P. Yadav, North Wales, PA (US); Kyle A. Hanah, Mundelein, IL (US); Madhuvanti S. Kale, Mundelein, PA (US)

(73) Assignees: The United States of America as represented by the Secretary of Agriculture, Washington, DC (US); AgriFiber Solutions, LLC, Mundelein, IL (US)

( * ) Notice: Subject to any disclaimer, the term of this patent is extended or adjusted under 35 U.S.C. 154(b) by 90 days.

(21) Appl. No.: 14/872,533

(22) Filed: Oct. 1, 2015

(65) Prior Publication Data
US 2017/0094994 A1  Apr. 6, 2017

(51) Int. Cl.
| | | |
|---|---|---|
| *A23L 1/0534* | (2006.01) | |
| *A23L 29/00* | (2016.01) | |
| *A23L 29/219* | (2016.01) | |
| *A23L 29/238* | (2016.01) | |
| *A23L 29/25* | (2016.01) | |
| *A23L 33/22* | (2016.01) | |

(52) U.S. Cl.
CPC ............ *A23L 29/00* (2016.08); *A23L 29/219* (2016.08); *A23L 29/238* (2016.08); *A23L 29/25* (2016.08); *A23L 33/22* (2016.08); *A23V 2002/00* (2013.01)

(58) Field of Classification Search
CPC .. A23K 31/715; A23K 31/723; A23K 31/732; A23L 19/00; A23L 19/07; A23L 7/10; A23L 29/25; A23L 33/21
USPC .......................... 426/71, 573, 656, 658, 654
See application file for complete search history.

(56) References Cited

U.S. PATENT DOCUMENTS

| | | |
|---|---|---|
| 6,147,206 A | 11/2000 | Doner et al. |
| 6,287,609 B1 | 9/2001 | Marlett et al. |
| 2001/0051203 A1* | 12/2001 | Ueda .................. A23L 2/39 426/573 |
| 2003/0013679 A1 | 1/2003 | Wolf et al. |
| 2006/0099324 A1* | 5/2006 | Aurio ................. A61K 31/715 426/656 |

(Continued)

OTHER PUBLICATIONS

"Psyllium Seeds, Psyllium Husk Seeds," http://www.psylliums.com/psyllium_seed.htm, pp. 1-3, 2007.*

(Continued)

*Primary Examiner* — Helen F Heggestad
(74) *Attorney, Agent, or Firm* — John Fado; G. Byron Stover

(57) ABSTRACT

Disclosed are methods of decreasing the viscosity of an aqueous suspension of a water insoluble or sparingly soluble dietary fiber (compared to the viscosity of the dietary fiber alone), involving mixing the dietary fiber with water and a soluble compound (e.g., polysaccharide having a molecular weight of about 500 Da to about 1,000 kDa and 1% solution viscosity of up to 10 mPa·s; or protein having a molecular weight of about 10 to about 500 kDa and a 1% solution viscosity of up to 10 mPa·s).

9 Claims, 10 Drawing Sheets

(56) References Cited

U.S. PATENT DOCUMENTS

2009/0123597 A1* 5/2009 Williams et al.

OTHER PUBLICATIONS

Psyllium—Wikipedia, pp. 1-5, https://en.wikipedia.org/wiki/Psyllium, 2004.*
Fischer, Milton H. et al., The gel-forming polysaccharide of psyllium husk, Carbohydrate Research (Plantago ovate Forsk), (2004), 339:2009-2017.
Guo, Qian et al., Fractionation and physicochemical characterization of psyllium gum, Carbohydrate Polymers, (2008), 73:35-43.
Kale, Madhuvanti S. et al., Suppression of Psyllium Husk Suspension Viscosity by Addition of Water Soluble Polysaccharides, (2016), Journal of Food Science, (2016), 87(10):e2476-e2483.
Dikeman, Cheryl L. et al., Dietary Fibers Affect Viscosity of Solutions and Simulated Human Gastric and Small Intestinal Digesta, The Journal of Nutrition, (2006), 136:913-919.
International Searching Authority, PCT/US2016/054662 for The United States of America, as Represented by the Secretary of Agriculture et al., International Filing date Sep. 30, 2016.

* cited by examiner

METHODS OF DECREASING THE VISCOSITY OF A DIETARY FIBER

BACKGROUND OF THE INVENTION

Disclosed are methods of decreasing the viscosity of an aqueous suspension of a water insoluble or sparingly soluble dietary fiber (compared to the viscosity of the dietary fiber alone), involving mixing the dietary fiber with water and a soluble compound (e.g., polysaccharide having a molecular weight of about 500 Da to about 1,000 kDa and a 1% solution viscosity of up to 10 mPa·s; or protein having a molecular weight of about 10 to about 500 kDa and a 1% solution viscosity of up to 10 mPa·s).

Psyllium seed husk (Plantago ovata) is a dietary fiber that is widely recognized for its health benefits, including relieving constipation, lowering cholesterol, improving insulin sensitivity and reducing postprandial hyperglycemia, prevention of colon cancer, and weight management (Anderson, J., et al., American Journal of Clinical Nutrition, 70: 466-473 (1999); Belknap, D., et al., Heart & Lung: The Journal of Acute and Critical Care, 26(3): 229-237 (1997); Davidson, M. H., et al., American Journal of Clinical Nutrition, 67(3): 367-376 (1998); Marlett, J. A., and M. H. Fischer, The Journal of Nutrition, 132(9): 2638-2643 (2002); Marlett, J. A., et al., American Journal of Clinical Nutrition, 72: 784-789 (2000); Pittler, M. H., and E. Ernst, American Journal of Clinical Nutrition, 79: 529-536 (2004); Ziai, S. A., Psyllium, I N: S. S. Cho & P. Samuel (Eds.), Fiber ingredients: Food applications and health benefits, pp. 393-426, 2009, CRC Press, Boca Raton, Fla.). It consists of a highly branched acidic arabinoxylan with β-(1,3) and β-(1,4) linkages in the xylan backbone, substituted with L-arabinose, D-galactose, D-rhamnose, D-galacturonic acid, and 4-O-methyl-D-glucuronic acid (Guo, Q., et al., Carbohydrate Polymers, 73: 35-43 (2008); Kennedy, J. F., et al., Carbohydrate Research, 75: 265-274 (1979); Yu, L., et al., Advances in Food and Nutrition Research, 55: 193-220 (2008)). It is an extremely hydrophilic material which absorbs several times its weight in water, thus swelling to form a gel or a highly viscous suspension, depending on the concentration. The high viscosity of psyllium husk is a major hurdle in terms of consumer acceptance. Numerous attempts have been made in the past to decrease the viscosity of this material in order that a physiologically significant amount may be consumed in a single serving. Most studies of this nature have focused on modification of the psyllium polysaccharides using physical, chemical, or enzymatic methods in order to decrease viscosity (Cheng, Z., et al., Journal of Functional Foods, 1: 44-49 (2009); Niu, Y., et al., Food Chemistry, 132(2): 1025-1032 (2012); Van Craeyveld, V., et al., Journal of Agricultural and Food Chemistry, 56: 11306-11311 (2008); Yu, L., and J. Perret, Lebensmittel Wissenschaft and Technologie, 36: 203-208 (2003); Yu, L., et al., Food Chemistry, 82: 243-248 (2003)). Yu et. al. (Yu et al., 2008) have reviewed in detail the various health benefits of psyllium husk as well as approaches to suppress its viscosity.

While there is some evidence that the health benefits, most notably the hypocholesterolemic effect, of psyllium husk are not compromised by some of the physical, chemical, or enzymatic modifications, it is not clear if such modifications will affect the other physiological effects of psyllium. In addition, most studies showing hypocholesterolemic effect of modified psyllium are in vitro studies (Cheng et al., 2009; Niu et al., 2012) or animal studies (Allen, K. G. D., et al., Journal of Agricultural and Food Chemistry, 52(16): 4998-5003 (2004)), and human feeding trials are lacking. In terms of ease of processing, the high water absorbing capacity and high viscosity of psyllium husk powder make it very difficult to process in wet form, necessitating the use of very large amounts of water which is then removed by various drying techniques using significant amounts of energy. Solid state enzymatic treatment procedures overcome this difficulty by processing the material in a dry state, but the treatment can be expensive due to the cost of the enzyme itself.

We have developed novel methods of decreasing the viscosity of dietary fibers (e.g., psyllium husk suspensions) based on the inclusion of a soluble compound (e.g., polysaccharide or protein) in the mixture. This approach does not involve partial replacement of the psyllium husk by another polysaccharide or protein, but rather the inclusion of an additional polysaccharide or protein material in the mixture. Thus if the soluble polysaccharide used is non-digestible, this approach can deliver a greater amount of fiber in a single serving than psyllium alone, while also decreasing the viscosity and thus improving palatability.

SUMMARY OF THE INVENTION

Disclosed are methods of decreasing the viscosity of an aqueous suspension of a water insoluble or sparingly soluble dietary fiber (compared to the viscosity of the dietary fiber alone), involving mixing the dietary fiber with water and a soluble compound (e.g., polysaccharide having a molecular weight of about 500 Da to about 1,000 kDa and a 1% solution viscosity of up to 10 mPa·s; or protein having a molecular weight of about 10 to about 500 kDa and a 1% solution viscosity of up to 10 mPa·s).

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 1A is 1% solution and FIG. 1B is 2% solution.

DETAILED DESCRIPTION OF THE INVENTION

Figure 1A:
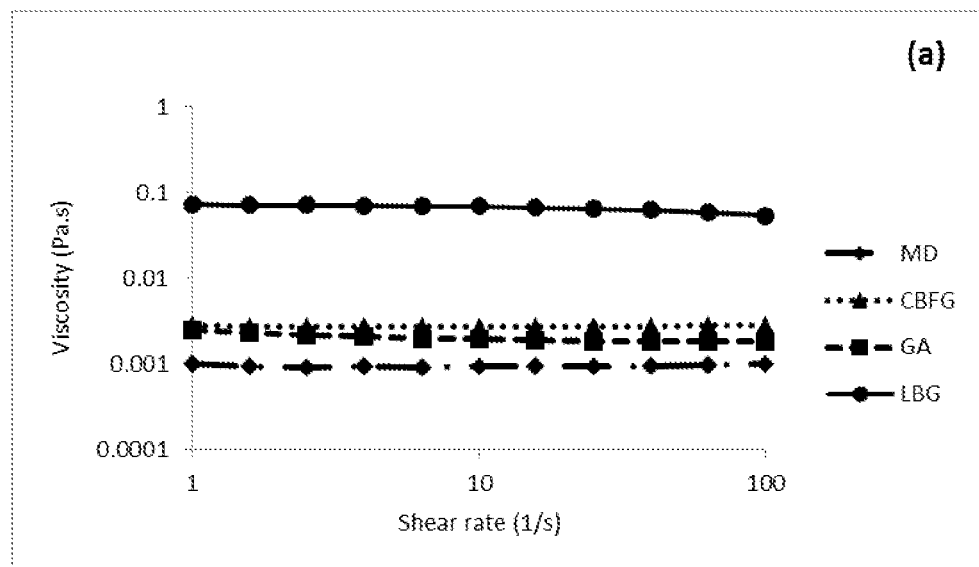
FIGS. 1A and B show flow curves of solutions of the soluble polysaccharides in water as described below.
Figure 1B:
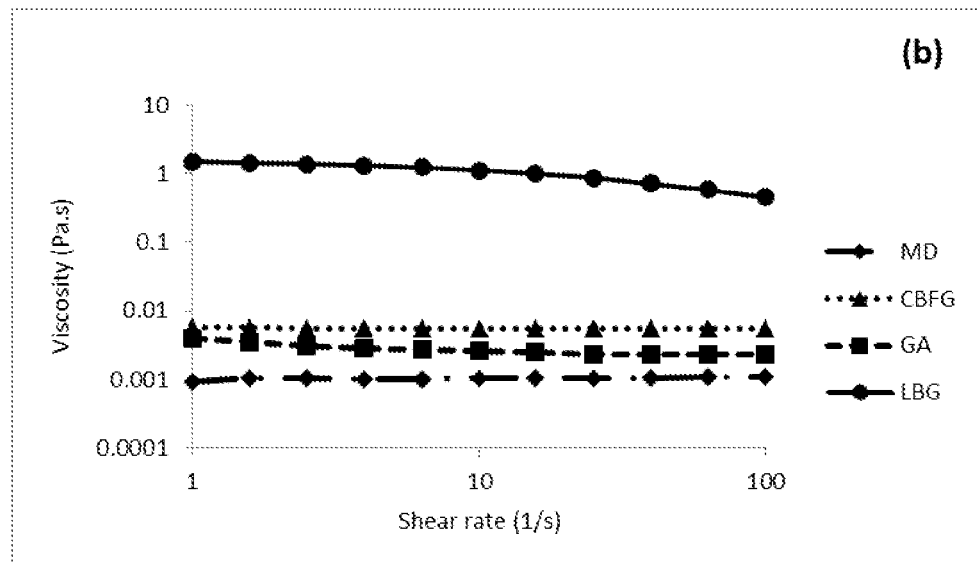
Figure 2A:
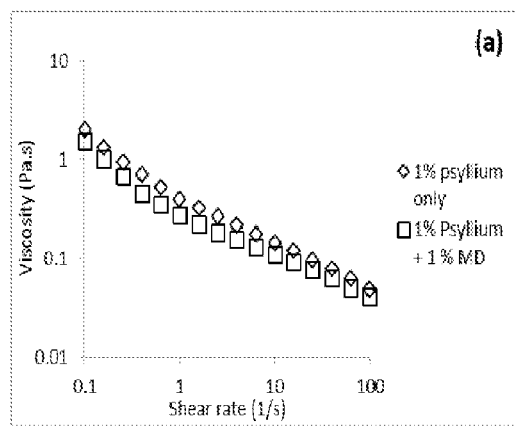
FIGS. 2A-D show flow curves of 1% psyllium husk powder suspensions with and without 1% MD (FIG. 2A), 1% CBFG (FIG. 2B), 1% GA (FIG. 2C), and 1% LBG (FIG. 2D) as described below.
Figure 2B:
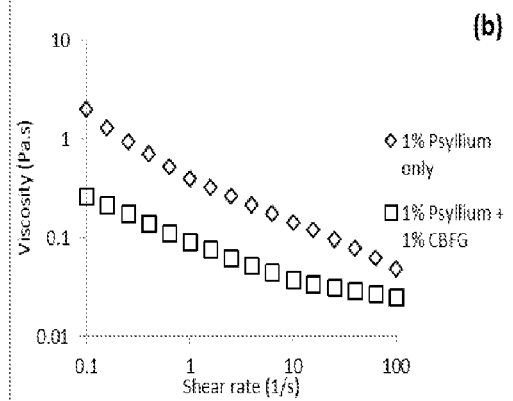
Figure 2C:
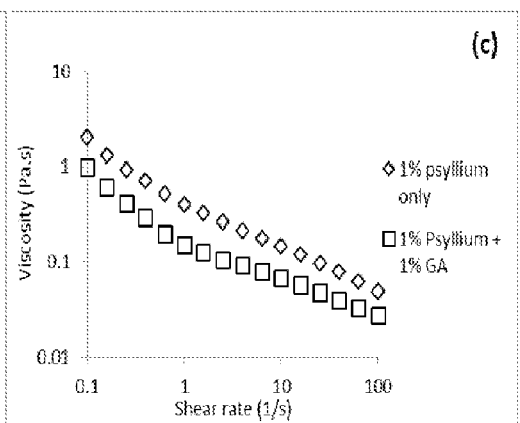
Figure 2D:
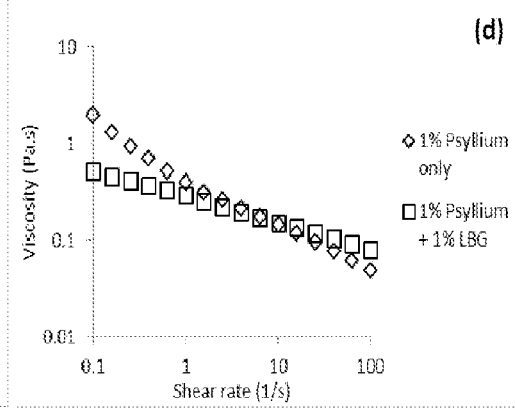

Disclosed are methods of decreasing the viscosity of an aqueous suspension of a water insoluble or sparingly soluble dietary fiber (compared to the viscosity of the dietary fiber alone), involving mixing the dietary fiber with water and a soluble compound (e.g., polysaccharide having a molecular weight of about 500 Da to about 1,000 kDa and a 1% solution viscosity of up to 10 mPa·s; or protein having a molecular weight of about 10 to about 500 kDa and a 1% solution viscosity of up to 10 mPa·s). The dietary fiber can be any insoluble or sparingly soluble hydrophilic dietary fiber, including but not limited to psyllium husk, Dietary fiber gels (U.S. Pat. Nos. 5,766,662 and 7,625,591), Cellulosic Arabinoxylan Fiber (U.S. patent application Ser. No. 14/745,962), Insoluble Biomass Gel (U.S. patent application Ser. No. 14/745,962), beta glucan, etc.

Suspensions may be prepared as follows: Suspensions of a water insoluble or sparingly soluble dietary fiber (e.g., psyllium husk powder) in the presence or absence of soluble compounds (e.g., polysaccharides, proteins) may be prepared by weighing appropriate quantities of each material and hydrating in pure water overnight at room temperature. In case of samples in which the materials are added sequentially, the water insoluble or sparingly soluble dietary fiber (e.g., psyllium husk powder) or the soluble compound (e.g., polysaccharides, proteins) may be allowed to hydrate fully (e.g., for at least about 30 minutes up to about 24 hours (30 minutes to 24 hours; preferably at least 30 minutes up to about 12 hours (30 minutes up to 12 hours), more preferably at least 30 minutes up to about 6 hours (30 minutes up to 6 hours) before adding the other. The samples may then be allowed to hydrate overnight at room temperature.

The inclusion of high molecular weight low viscosity soluble compounds (e.g., polysaccharides, proteins) can lead to a significant decrease in the viscosity of water insoluble or sparingly soluble dietary fiber (e.g., psyllium husk suspensions).

"Optional" or "optionally" means that the subsequently described event or circumstance may or may not occur, and that the description includes instances in which said event or circumstance occurs and instances where it does not. For example, the phrase "optionally comprising a defoaming agent" means that the composition may or may not contain a defoaming agent and that this description includes compositions that contain and do not contain a foaming agent.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

Unless defined otherwise, all technical and scientific terms used herein have the same meaning as commonly understood by one of ordinary skill in the art to which the invention belongs. As used herein, the term "about" refers to a quantity, level, value or amount that varies by as much as 30%, preferably by as much as 20%, and more preferably by as much as 10% to a reference quantity, level, value or amount. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Four soluble polysaccharides, namely maltodextrin (MD), gum Arabic (GA), corn bio-fiber gum (CBFG), which is a commercial corn bran arabinoxylan product, and locust bean gum (LBG) have been used, in order to study the effect of the molecular weight and solution viscosity of the polysaccharides on the viscosity suppression of psyllium.

Psyllium husk powder (95% 40 mesh) was obtained from AEP Colloids (Hadley, N.Y.). Maltodextrin (DE 4.0-7.0) and locust bean gum were purchased from Sigma Aldrich (St. Louis, Mo.). Gum Arabic was obtained from TIC Gums (Hunt Valley, Md.) and corn bio-fiber gum was a kind gift from Z-Trim Holdings, Inc. (Mundelein, Ill.). Corn biobased fiber gums (CBFG) used herein was prepared from an alkaline waste stream of commercial production of Z-trim® (commercial fiber gel under U.S. Pat. Nos. 5,766,662 and 7,625,591) from agricultural processing by-products, such as corn bran/fiber, oat hull, wheat bran, soy hull, rice fiber, rice bran, etc., by following the procedures described in U.S. Patent Application Publication 20140017376

(0097.12), CBFG was prepared from the alkaline extract of corn bran, which is a waste stream product of commercial Z-Trim fiber gel production. The waste streams were ultra-filtered using 50,000, 100,000 or 120,000 Dalton molecular weight cut off line membranes to remove small molecular weight fractions containing fats, proteins, salts and oligosaccharides, resulting in an arabinoxylan rich fraction as retentates. The retentates were then concentrated by evaporation and then dried either by drum drying or spray drying process. The resulting dry product is CBFG. Such material may also be prepared from the above mentioned raw material sources following the procedure given in U.S. Pat. No. 6,147,206.

Preparation of suspensions: Suspensions of psyllium husk powder in the presence or absence of soluble polysaccharides were prepared by weighing appropriate quantities of each material and hydrating in pure water overnight at room temperature. In case of samples in which the materials were added sequentially, the psyllium husk powder or the soluble polysaccharide was allowed to hydrate fully (e.g., for at least about 30 minutes up to about 24 hours (30 minutes to 24 hours; preferably at least 30 minutes up to about 12 hours (30 minutes up to 12 hours), more preferably at least 30 minutes up to about 6 hours (30 minutes up to 6 hours)

before adding the other. The samples were then allowed to hydrate overnight at room temperature.

Rheological measurements: Shear viscosity of the suspensions was measured using an Anton Paar MCR 102 rotational rheometer (Anton Paar GmbH, Graz, Austria) with the concentric cylinder geometry. Measurements were made at 25° C. and shear rate was varied from 0.1 to 100 s$^{-1}$.

Water holding capacity determination: Water holding capacity (WHC) of psyllium husk powder was determined by hydrating 0.5 g psyllium in 24.5 g water overnight at 25° C., followed by centrifugation at 1000 rpm (relative centrifugal force of 120 g) for 15 minutes. The amount of water held was calculated based on the difference in weight between the swollen psyllium husk gel and the original psyllium husk powder. In case of WHC determination in the presence of soluble polysaccharides, a 1% solution of the respective polysaccharide in water was prepared beforehand, and 24.5 g of this solution was added to 0.5 g of the psyllium husk powder. The hydration, centrifugation, and WHC calculation was performed as described for the previous sample.

Results. Viscosity and molecular weight of soluble polysaccharides: The molecular weight and shear viscosity of 1% solutions of the polysaccharides in water are given in Table 1. The four polysaccharides cover a wide range of molecular weights, from 2.5-5 kDa for the maltodextrin (based on the dextrose equivalent), up to 1000 kDa or more for the locust bean gum (Dakia, P. A., et al., Food Hydrocolloids, 22: 807-818 (2008); Doublier, J. L., and B. Launay, Journal of Texture Studies, 12: 151-172 (1981)). Gum Arabic and corn bio-fiber gum have comparable molecular weights, around 250-350 kDa (Al-Assaf, S., et al., Food Hydrocolloids, 19: 647-660 (2005); Saulnier, L., et al., Carbohydrate Polymers, 26: 279-287 (1995); Yadav, M. P., et al., Cereal Chemistry, 84(2): 175-180 (2007)). FIGS. 1(a) and (b) show the flow curves of the polysaccharides at concentrations of 1% and 2% respectively. The data shown is an average of duplicate measurements and the standard error bars are smaller than the graph symbols. It is noted that all the polysaccharides showed Newtonian behavior at 1% and only locust bean gum showed some shear thinning behavior at 2% concentration. Thus an average Newtonian viscosity value for the polysaccharides at 1% concentration is reported in Table 1. Maltodextrin, gum Arabic, and corn bio-fiber gum showed low viscosity in solution with slight differences among the three, while locust bean gum showed very high viscosity as expected since it is a high viscosity polysaccharide. Thus the four polysaccharides used in this study offered a wide range of molecular weights as well as solution viscosities. MD is a low molecular weight, low viscosity material, GA and CBFG have high molecular weight but low viscosity, whereas LBG has a very high molecular weight as well as high viscosity.

Flow curves of mixed suspensions of psyllium and soluble polysaccharides: FIGS. 2 and 3 show flow curves of psyllium suspensions with and without added polysaccharides at different concentrations. For these figures as well as FIG. 4, the data shown is an average of duplicate measurements; the standard error bars are smaller than the graph symbols, and have been excluded for the sake of clarity. In nearly all cases as seen in FIGS. 2 and 3, inclusion of the water soluble polysaccharide led to a decrease in viscosity of the psyllium suspension. The viscosity decrease was less significant in case of psyllium-MD suspensions and surprisingly most significant for the Psyllium-CBFG mixture. The psyllium-GA suspensions also showed lower viscosity than psyllium alone. The flow curve for the LBG containing suspension had a markedly different form than the pure psyllium suspension with lower viscosity at low shear rates and higher viscosity at high shear rates. This suggests that the viscosity of this mixed psyllium-LBG suspension was significantly affected by the viscosity of LBG itself, whereas the other polysaccharides, having a low solution viscosity, merely suppressed the build-up of psyllium viscosity. From FIG. 3 it is clear that in all cases (except LBG) the addition of 2% polysaccharide surprisingly led to a greater decrease in suspension viscosity than 1% polysaccharide. In case of psyllium-LBG suspensions, addition of more LBG actually led to an increase in viscosity, once again suggesting that the high viscosity of LBG itself is responsible for this phenomenon.

FIG. 4 shows the effect of addition sequence on the suspension viscosity. The suspensions in which the psyllium was allowed to hydrate before adding the soluble polysaccharide tended to show slightly higher viscosity than those in which the two were added simultaneously or those in which the soluble polysaccharide was added first. The latter two suspensions showed very similar viscosities. This effect was surprisingly most apparent in the case of psyllium-CBFG suspensions but was also present to some extent in the other samples.

Viscosity suppression factor: In order to quantify the suppression of viscosity of psyllium suspensions by inclusion of a soluble polysaccharide, a fractional viscosity suppression factor (VSF) was calculated by expressing the difference between viscosities of psyllium suspensions and psyllium-polysaccharide suspensions as a fraction of psyllium suspension viscosity at a shear rate of 1 s$^{-1}$ (Equation 1).

$$VSF = \frac{\eta_{psyllium} - \eta_{mixed\ suspension}}{\eta_{psyllium}} \quad (1)$$

Figure 5:
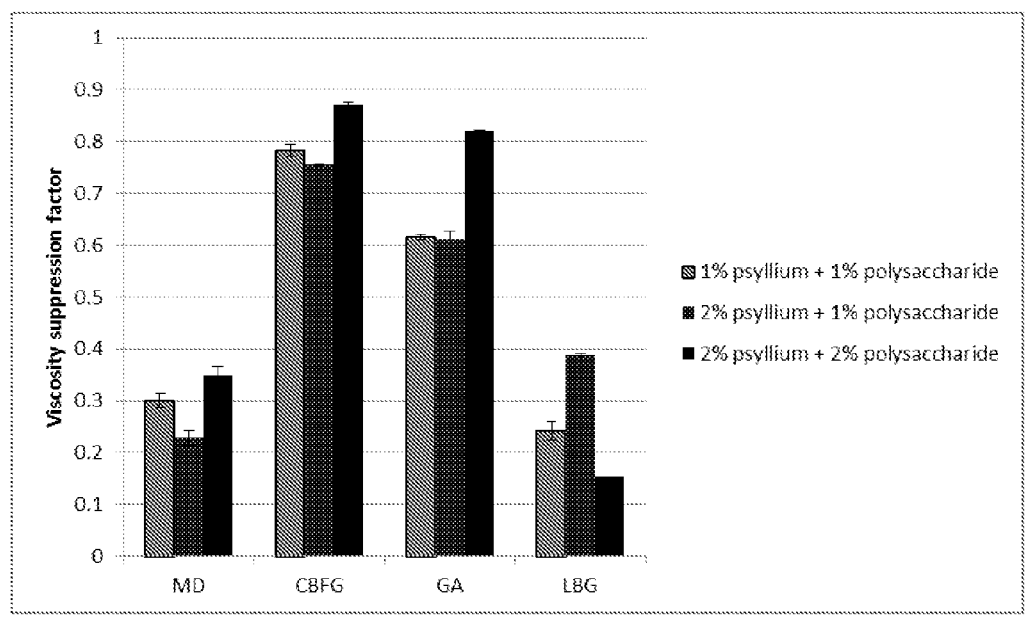
FIG. 5 shows viscosity suppression factor for mixed solutions of psyllium husk powder with soluble polysaccharides, higher bars indicate greater viscosity suppression, implying that the mixed suspension had lower viscosity as described below.

Thus higher values of this factor show that the polysaccharide was more effective in suppressing the viscosity of psyllium; in other words, the higher the value of VSF the greater the effectiveness of the polysaccharide in suppressing viscosity. FIG. 5 shows the viscosity suppression factors for the various psyllium-polysaccharide suspensions at different concentrations. It is clear that at all concentrations, CBFG showed the highest VSF. The magnitude of viscosity suppression was surprisingly high, with the psyllium-CBFG suspensions showing up to 87% lower viscosity than psyllium alone, as seen in FIG. 5. In the case of MD, CBFG and GA, the VSF slightly decreased when the concentration of psyllium was increased while keeping the soluble polysaccharide concentration constant. However, in case of LBG the VSF was higher when less LBG was present in the system compared to psyllium. This again suggests that LBG was a unique case and the reasoning behind this observation is discussed in more detail below.

Figure 6:
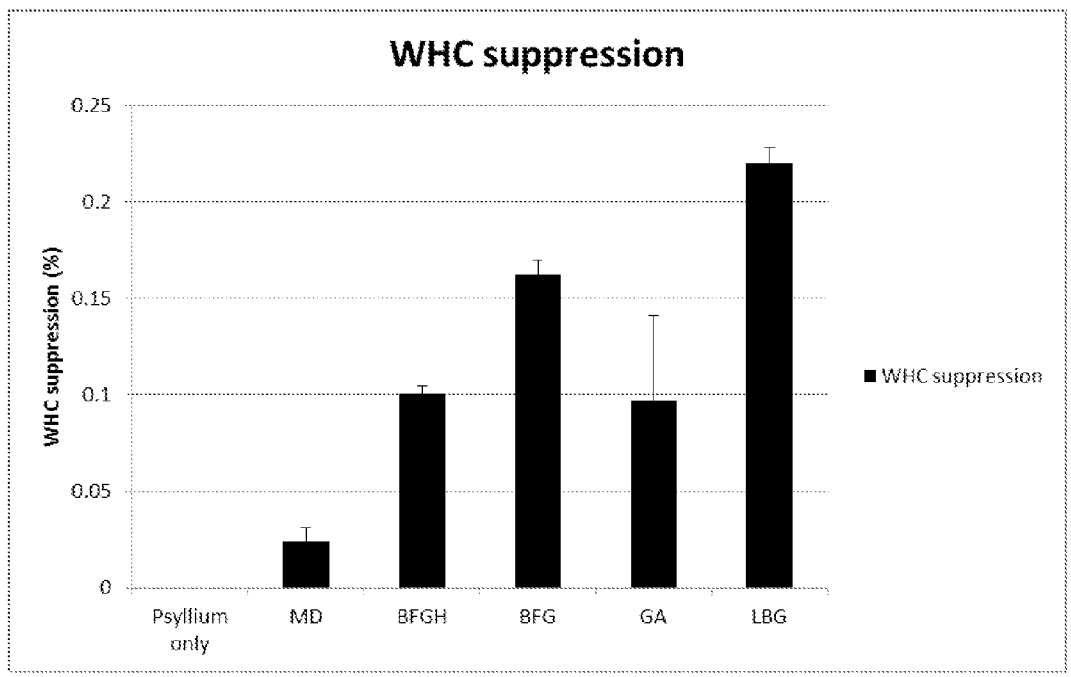
FIG. 6 shows suppression of water holding capacity of psyllium husk by soluble polysaccharides as described below.

Water holding capacity suppression: Table 2 shows the water holding capacity of psyllium husk powder in the presence of various polysaccharides and FIG. 6 shows the WHC suppression caused by the polysaccharides expressed as a percentage (Equation 2).

$$WHC\ suppression = \frac{WHC_{water\ only} - WHC_{polysaccharide\ solution}}{WHC_{water\ only}} \times 100 \quad (2)$$

While the psyllium husk powder by itself held about 45.7 g of water per gram, the inclusion of soluble polysaccharides surprisingly decreased its water holding capacity: the decrease was lowest (2.44%) in case of MD and, surprisingly, highest (22.01%) in the case of LBG, CBFG and GA led to 16.20% and 9.74% decrease in water holding capacity, respectively.

Figure 3A:
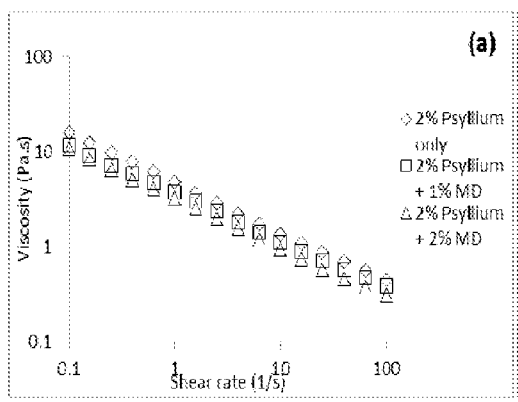
FIGS. 3A-D show flow curves of 2% psyllium husk powder suspensions without added polysaccharide and with 1% and 2% of MD (FIG. 3A), CBFG (FIG. 3B), GA (FIG. 3C), and LBG (FIG. 3D) as described below.
Figure 3B:
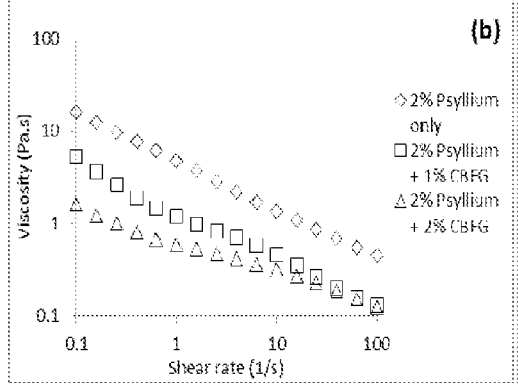
Figure 3C:
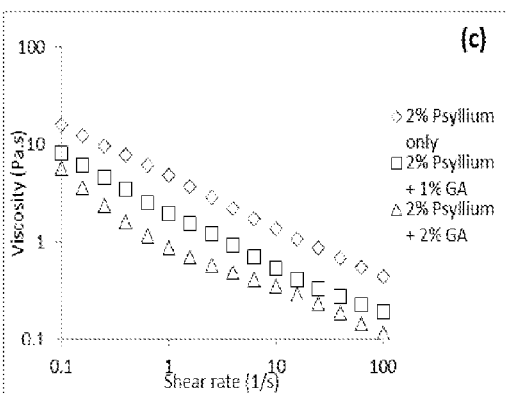
Figure 3D:
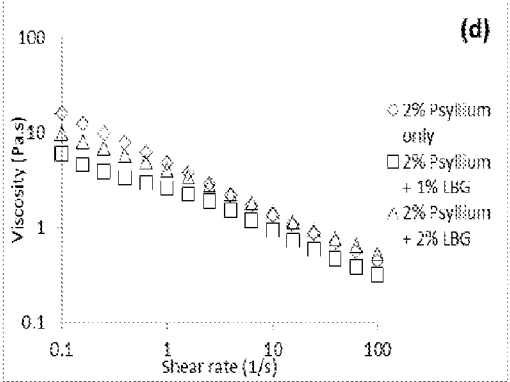
Figure 4A:
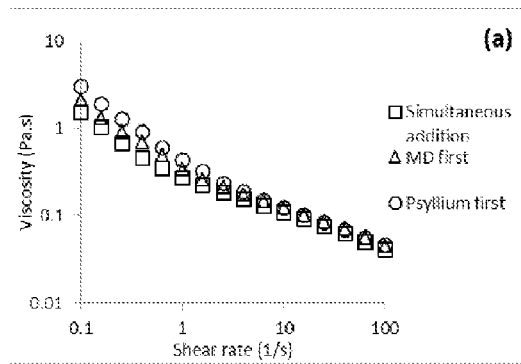
FIGS. 4A-D show flow curves depicting the effect of sequence of addition on viscosity of suspensions with 1% psyllium husk powder and 1% MD (FIG. 4A), 1% CBFG (FIG. 4B), 1% GA (FIG. 4C), and 1% LBG (FIG. 4D) as described below.
Figure 4B:
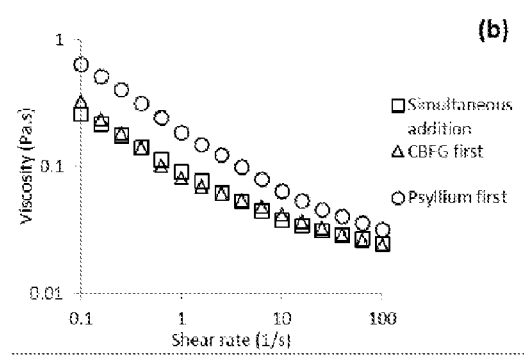
Figure 4C:
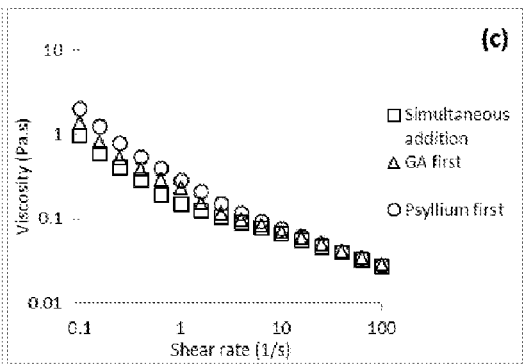
Figure 4D:
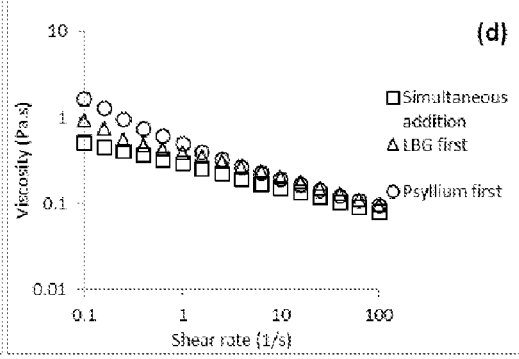

Discussion: It is clear from the rheology data that the inclusion of some water soluble polysaccharides in psyllium suspensions surprisingly led to a significant decrease in their viscosity. The viscosity suppression appears to be due to a decrease in swelling of the psyllium husk particles, as suggested by WHC suppression, leading to reduced viscosity. The mechanism of the WHC suppression is likely to be related to the binding of water by the soluble polysaccharide, leading to a decrease in the amount of free water available to hydrate and swell the psyllium husk particles. This hypothesis was supported by the data from FIG. 4 which showed that when the psyllium was allowed to hydrate in water prior to the addition of the soluble polysaccharide, surprisingly a slightly higher viscosity was developed. FIGS. 3(b) and (c) also showed that when a greater amount of soluble polysaccharide was added to the system, the viscosity of the suspension surprisingly decreased further, presumably due to even more hampered swelling of the psyllium husk particles. The direct measurement of water holding capacity in the presence of soluble polysaccharides (Table 2 and FIG. 6) was also supportive of the hypothesis that the polysaccharides hampered the swelling of psyllium particles. It is surprising, however, that a relatively small decrease in water holding capacity (16% in case of CBFG) led to a very large decrease in viscosity (VSF of 77% in case of 1% psyllium 1% CBFG suspension). This may be explained on the basis of the mechanism of viscosity development based on friction between particles. Particles that are less swollen would occupy lower volume in the suspension, and therefore be less likely to interact with each other in the flow field. If, as in the case of CBFG and GA, the medium interspersed between the particles is of low viscosity, the overall viscosity of the suspension would surprisingly decrease significantly as a result.

The fact that MD surprisingly led to the least WHC suppression can be explained on the basis of its low molecular weight. It is interesting to note from FIG. 3(a) that there was a trend, although very slight, towards decreasing viscosity due to increasing amounts of MD in the system. This is also clear from FIG. 5. It may therefore be possible that inclusion of very high amounts of MD in the solution will lead to meaningful decreases in psyllium viscosity. A high molecular weight polysaccharide that will bind more water even at lower concentrations, leading to greater WHC suppression, would be more effective in decreasing psyllium suspension viscosity, as evidenced by the fact that CBFG and GA surprisingly showed the highest viscosity suppression factors. The reason for the difference between VSFs of CBFG and GA, even though they have similar molecular weights is unclear, but may be attributed to differences in conformation that led to different extents of water binding by the two polymers.

The case of LBG is instructive. Being a very high molecular weight, high viscosity polysaccharide, it surprisingly showed the lowest values of VSF at nearly all concentrations. It was also unique in that it showed a greater VSF value when the psyllium concentration was increased to 2% while keeping LBG concentration at 1%. When LBG concentration was also increased to 2%, the VSF surprisingly decreased significantly. However, it was also the polysaccharide that led to maximum water holding capacity suppression (22%). This seeming contradiction is resolved when we consider the fact that LBG had a very high solution viscosity by itself. The LBG, owing to its high molecular weight, does bind a significant amount of water, thus suppressing the swelling of psyllium husk particles. However, the viscosity of the mixed suspension did not decrease much because the LBG contributes significantly to it. Thus, as is clear from FIGS. 3(d) and (5), addition of a larger amount of LBG surprisingly actually led to an increase in the viscosity of the mixed suspension. This data makes it clear that, to be effective in such a system, the soluble polysaccharide should have a low solution viscosity (e.g., about 2 mPa·s to up to about 10 mPa·s (2 mPa·s up to 10 mPa·s) while also having a high molecular weight as discussed before. Surprisingly few polysaccharides satisfy both of these conditions, gum Arabic and cereal arabinoxylans surprisingly being unique in this aspect.

It is possible that other high molecular weight low viscosity soluble polymers, such as bio-fiber gums (BFGs) from other agricultural sources (Yadav, M. P., et al., Bio-based Fiber Gums (BFGs) and processes for producing BFGs, U.S. Patent Application Publication 20140017376 or hydrophilic proteins (e.g., hydrophilic proteins such as bovine serum albumin (BSA), beta-lactoglobulin) may also have similar effects as the polysaccharides. This methodology can also apply to gums from seeds such as guar, Locust Bean gum, Konjac, Quince, Tamarind, Tara, and others known in the art. The advantage in using polysaccharides such as BFGs or gum Arabic lies in the fact that the composite system surprisingly becomes an extremely effective fiber delivery mechanism, wherein two different fiber sources, each with their own health benefits, may be offered in physiologically significant amounts in one serving of a fiber supplement while maintaining, and even improving, palatability.

Example 2. Three commercial protein preparations, namely whey protein isolate (WPI), soy protein isolate (SPI), and pea protein isolate (PPI) were used in order to investigate the ability of hydrophilic proteins to suppress the viscosity of psyllium husk suspensions.

Psyllium husk powder (95%, 40 mesh) was obtained from AEP Colloids (Hadley, N.Y.). Maltodextrin (DE 4.0-7.0) and locust bean gum were purchased from Sigma Aldrich (St. Louis, Mo.). WPI, PPI and SPI were obtained from Glanbia Nutritionals (Monroe, Wis.), Farbest Foods (Huntingburg, Ind.), and NutriPea Ltd (Potrage La Prairie, MB, Canada) respectively. The proteins used ranged in molecular wright from about 18 kDa (for beta lactoglobulin, which is the major component in WPI) to about 380 kDa (soy glycinin and pea legumin).

Preparation of suspensions: Suspensions of psyllium husk powder in the presence or absence of proteins were prepared by weighing appropriate quantities of each material and hydrating in pure water overnight at room temperature. In case of samples in which the materials were added sequentially, the psyllium husk powder or the protein was allowed to hydrate fully (e.g., for at least about 30 minutes up to about 24 hours (30 minutes to 24 hours; preferably at least 30 minutes up to about 12 hours (30 minutes up to 12 hours), more preferably at least 30 minutes up to about 6 hours (30 minutes up to 6 hours) before adding the other. The samples were then allowed to hydrate overnight at room temperature.

Rheological measurements: Shear viscosity of the suspensions was measured using an Anton Paar MCR 102 rotational rheometer (Anton Paar GmbH, Graz, Austria)

with the concentric cylinder geometry. Measurements were made at 25° C. and shear rate was varied from 0.1 to 100 s$^{-1}$.

Figures 7A, 7B:
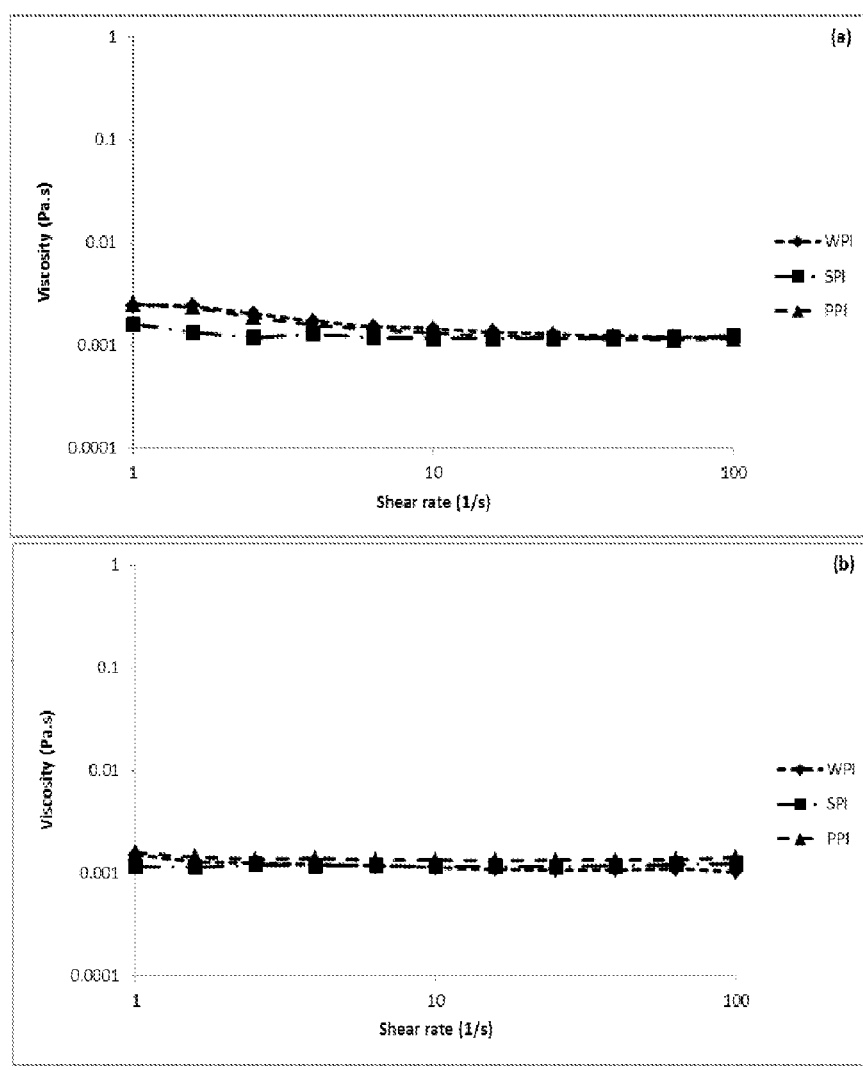
FIGS. 7A and B show flow curves of solutions of the protein samples in water as described below; 1% solutions (FIG. 7A) and 2% solutions (FIG. 7B).

Results. Solubility and viscosity of proteins: WPI was completely soluble in water and formed clear solutions at both concentration levels used in the experiments (1% and 2%). PPI was sparingly soluble in water even at the low concentration level of 1%, while SPI showed poor solubility. All protein solutions (or suspensions) showed very low viscosity (almost equivalent to the viscosity of water, 0.001 Pa·s or 1 mPa·s), as seen in FIG. 7.

Figures 8A, 8B, 8C:
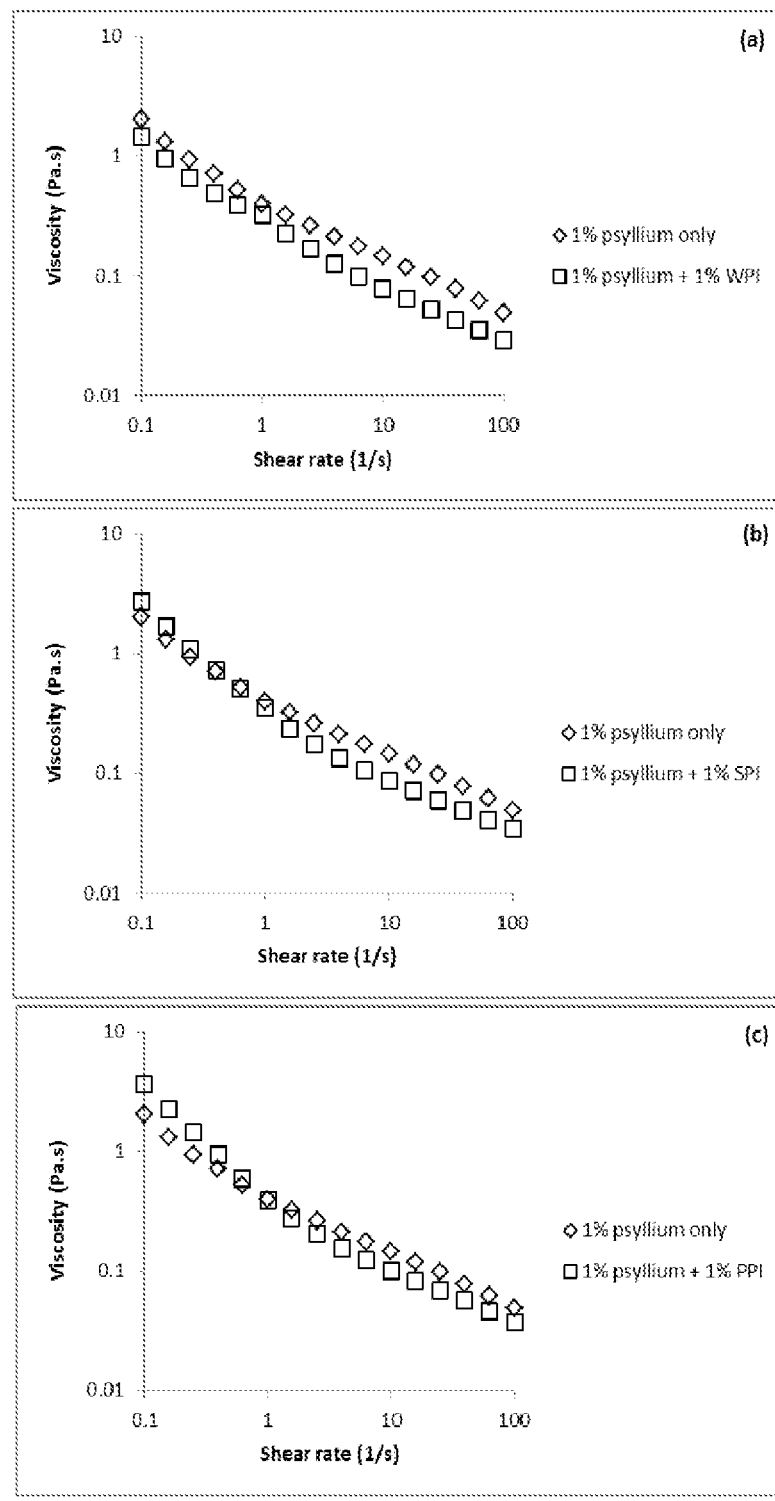
FIGS. 8A-C show flow curves of 1% psyllium husk powder suspensions with and without 1% WPI (FIG. 8A), 1% SPI (FIG. 8B), and 1% PPI (FIG. 8C) as described below.
Figures 9A, 9B, 9C:
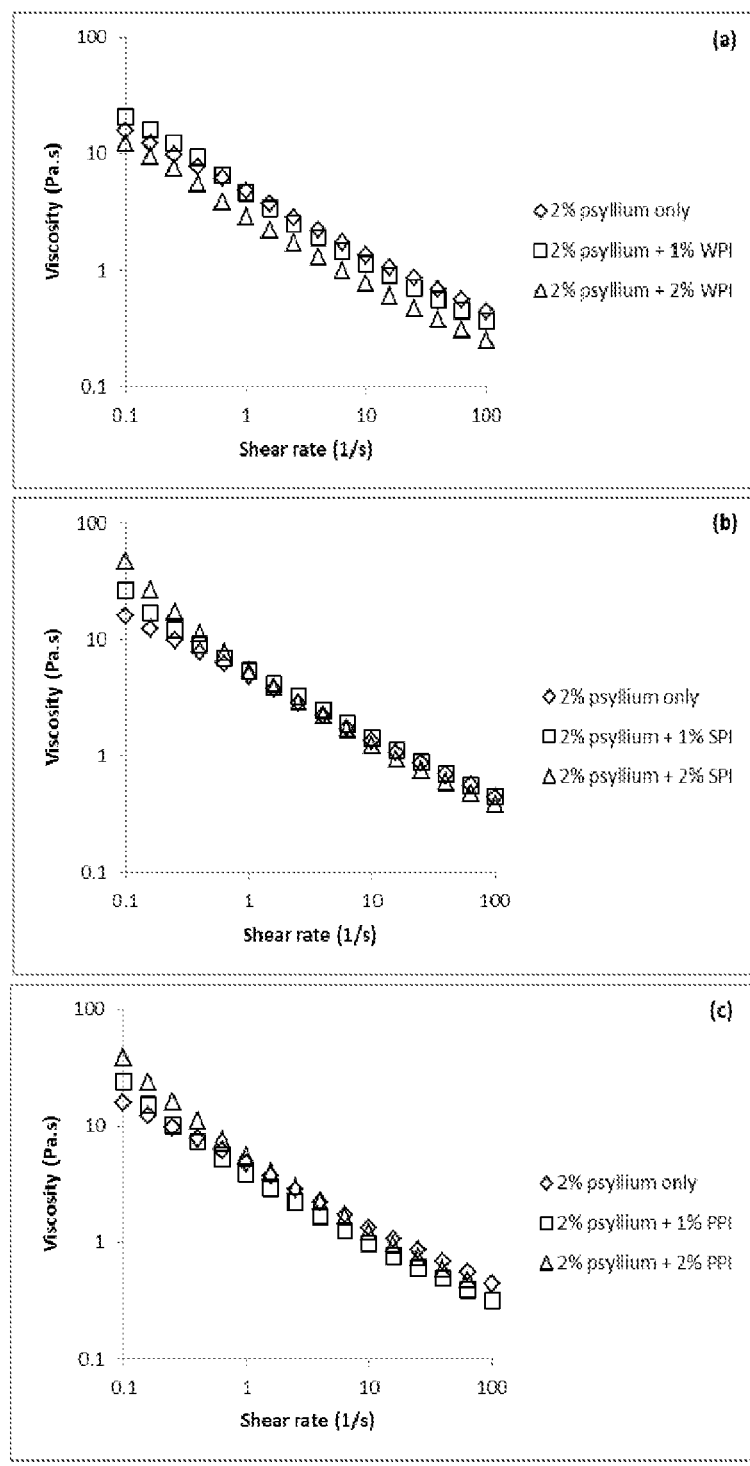
FIGS. 9A-C show flow curves of 2% psyllium husk powder suspensions without added protein and with 1% and 2% of WPI (FIG. 9A), SPI (FIG. 9B), and PPI (FIG. 9C) as described below.
Figure 10:
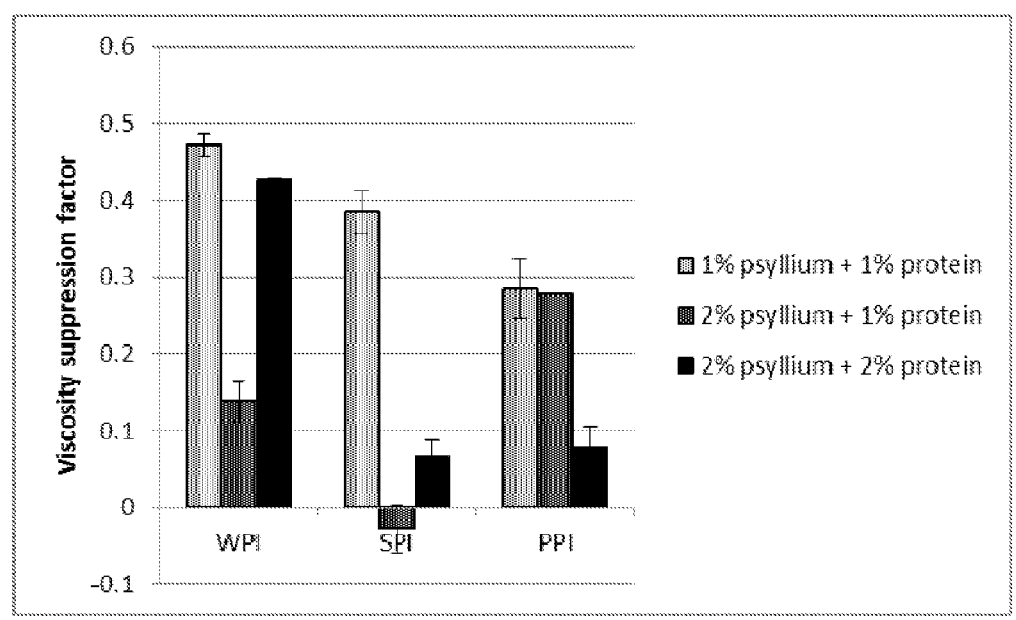
FIG. 10 shows viscosity suppression factor for mixed solutions of psyllium husk powder with proteins, higher bars indicate greater viscosity suppression, implying that the mixed suspension had lower viscosity as described below.

FIGS. 8 and 9 show the flow curves of mixed suspensions of psyllium husk powder and three commercial protein preparations at different concentrations. It is clear that WPI surprisingly suppressed the viscosity of psyllium suspensions, thus proving that a water soluble, low viscosity protein can be used along with psyllium husk as a formulation strategy to decrease viscosity. PPI and SPI did not show as high values of viscosity suppression factor as WPI (FIG. 10), which can be attributed to their low solubility. Among the two, PPI worked slightly better at higher psyllium concentrations, possibly because of its slightly better solubility in water. As with the polysaccharides, it is likely that the proteins competed with psyllium husk powder for available water, thus decreasing water absorption by psyllium husk particles and decreasing the viscosity of the suspension itself. Thus the inclusion of water soluble proteins (or proteins solubilized by slight changes of pH or chemical modifications) can be used both as a formulation strategy to decrease viscosity as well as to improve wet processing efficiency of psyllium husks by decreasing water absorption and eventually the energy requirement to remove the water to produce a dry product.

Conclusion: The data clearly showed that the inclusion of high molecular weight low viscosity soluble polysaccharides or proteins surprisingly led to a significant decrease in the viscosity of psyllium husk suspensions. In the mixed suspensions, the soluble polysaccharides bound some of the water, making it unavailable for psyllium husk particles to swell in. This is evidenced by a surprising decrease in the amount of water held by psyllium husk particles in the presence of soluble polysaccharides. The decrease in swelling contributed to a surprisingly significant decrease in viscosity of the suspension, which was observable only when the soluble polysaccharide itself did not contribute to high viscosity of the suspension. Among the four polysaccharides studied, maltodextrin led to a small decrease in water holding capacity as well as viscosity but did not significantly decrease either, apparently (possibly?) owing to its low molecular weight. Gum Arabic and corn bio-fiber gum surprisingly showed significant decreases in water holding capacity as well as viscosity, although corn bio-fiber gum was more effective in both these aspects. The fact that these polymers had both high molecular weight as well as low viscosity surprisingly contributed to their effectiveness. The inclusion of locust bean gum led to the largest decrease in water holding capacity of psyllium husk particles owing to its very high molecular weight; however, surprisingly it did not lead to a decrease in suspension viscosity due to the high viscosity of the locust bean gum itself. Among the proteins, WPI surprisingly significantly suppressed the viscosity of psyllium husk suspensions, while PPI and SPI were less effective, due to the low water solubility of the particular samples used.

Thus high molecular weight low viscosity polysaccharides or proteins can be used to decrease the viscosity of psyllium husk suspensions, thus contributing to increased palatability of the fiber supplement. Bio-fiber gums from other sources may thus be useful in this system. Additionally, this methodology of decreasing viscosity of a dietary fiber by suppressing its hydration can apply to other high viscosity polysaccharides as well, one example being cereal-derived or fermentation-derived beta Glucans.

Suppression of water absorption by psyllium husk particles by this approach may have major implications in the manufacturing process of psyllium husk-based fiber supplements, which often involves extensive washing of the psyllium husk particles with water. Due to the high WHC of the particles, the volumes of water required in this process can be tremendous. Additionally, after the washing is complete, a large amount of energy is required to remove the absorbed water and produce a dry product. The inclusion of a high molecular weight low viscosity soluble polysaccharide, such as CBFG, as a processing aid during the washing step will surprisingly decrease the amount of water absorbed by the psyllium husk particles, thus lowering the amount of water required for the washing step. This will also decrease the energy requirement in the drying step. Thus, high molecular weight low viscosity water soluble polysaccharides, such as CBFG, can be used as processing aids in the manufacturing of psyllium husk-based fiber supplements.

In terms of incorporation into a fiber supplement, this approach of psyllium viscosity modification surprisingly has the major advantage of increasing the amount of dietary fiber delivered in a serving, which can mean an additional physiological benefit if the soluble polysaccharide is fermentable in the colon. Besides the many health benefits offered by fermentable dietary fiber, the fermentable soluble polysaccharide is expected to be utilized by colonic microbiota, thus presumably allowing the psyllium to swell in vivo and still manifest its stool softening effect. Another benefit of this approach is that the psyllium itself is not modified in any way and there is therefore no risk of mitigating its health benefits. As a specific example of the usefulness of this approach, we may consider the case of Metamucil®, which is a psyllium husk-based fiber supplement. One serving of Metamucil®, which is a psyllium husk-based dietary fiber supplement, can currently deliver 3.4 g psyllium husk in 240 mL of water. By dry blending psyllium husk powder with a corn bran arabinoxylan product, it will be possible to deliver 4.8 g of psyllium and 4.8 g of arabinoxylan in 240 mL of water and maintain the same viscosity as the current formulation. Alternatively, the amount of psyllium delivered can be kept constant at 3.4 g and the viscosity of the formulation can be decreased by up to 85%. Thus the inclusion of soluble high molecular weight low viscosity polysaccharides with psyllium husk surprisingly is a promising way to increase palatability and consumer acceptance while at the same time delivering even more physiologically significant amounts of psyllium and another dietary fiber within a serving of the same product. Our methods can also be applied to highly viscous proteins to suppress their viscosity by the addition of soluble carbohydrates and/or proteins.

All of the references cited herein, including U.S. patents, are incorporated by reference in their entirety.

Thus, in view of the above, there is described (in part) the following:

A method of decreasing the viscosity of an aqueous suspension of a water insoluble or sparingly soluble dietary fiber (compared to the viscosity of the dietary fiber alone), said method comprising (or consisting essentially of or consisting of) combining said dietary fiber with water and a soluble compound (e.g., polysaccharide, protein).

The above method, wherein said dietary fiber is psyllium seed husk.

The above method, wherein said soluble compound is selected from the group consisting of polysaccharide, protein, and mixtures thereof.

The above method, wherein said soluble compound is polysaccharide having a molecular weight of about 500 Da to about 1,000 kDa (preferably about 200 kDa (200)) and a 1% solution viscosity of up to 10 mPa·s (e.g., about 2 up to about 10 mPa·s (2-10)). The above method, wherein said polysaccharide is selected from the group consisting of maltodextrin, gum Arabic, corn bio-fiber gum, and mixtures thereof. The above method, wherein said polysaccharide is selected from the group consisting of gum Arabic, corn bio-fiber gum, and mixtures thereof. The above method, wherein said polysaccharide is gum Arabic. The above method, wherein said polysaccharide is corn bio-fiber gum.

The above method, wherein said soluble compound is mixed simultaneously with said dietary fiber in water.

The above method, wherein said soluble compound is mixed in water for about 30 minutes to about 24 hours and subsequently said dietary fiber is added.

The above method, wherein said soluble compound is protein having a molecular weight of about 10 to about 500 kDa (e.g., 10-500 kDa) and a 1% solution viscosity of up to 10 mPa·s (e.g., about 2 up to about 10 mPa·s (2-10)). The above method, wherein said protein is selected from the group consisting of whey protein isolate, pea protein isolate, and mixtures thereof. The above method, wherein said protein is whey protein isolate. The above method, wherein said protein is, pea protein isolate.

A composition comprising at least one dietary fiber and at least one soluble compound. The above composition, wherein said soluble compound is selected from the group consisting of polysaccharide, protein, and mixtures thereof. The above composition, wherein said soluble compound is polysaccharide having a molecular weight of about 500 Da to about 1,000 kDa (500-1000) and a 1% solution viscosity of up to 10 mPa·s [about 2 up to about 10 mPa·s]. The above composition, wherein said soluble compound is protein having a molecular weight of about 10 to about 500 kDa (10-500) and a 1% solution viscosity of up to 10 mPa·s.

The above composition, wherein said is produced by combining dietary fiber with water and a soluble compound.

A method for processing psyllium husk particles, wherein said method comprises including a soluble compound in the water used for washing said psyllium husk particles thereby reducing the swelling of said psyllium husk particles.
(and subsequent energy use for drying, without compromising cleaning of the particle surface).

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Molecular weight range and viscosity of a 1% solution of the soluble polysaccharides.

| Sample | Molecular weight range (kDa) | Viscosity of 1% solution (mPa · s) |
|---|---|---|
| Maltodextrin | 2.5-5[a] | 0.94 |
| CBFG | 200-300[b] | 2.77 |

TABLE 1-continued

Molecular weight range and viscosity of a 1% solution of the soluble polysaccharides.

| Sample | Molecular weight range (kDa) | Viscosity of 1% solution (mPa · s) |
|---|---|---|
| Gum Arabic | 250-350[c] | 2.01 |
| Locust bean gum | 900-1000[d] | 66.1 |

[a]Based on dextrose equivalent provided by manufacturer.
[b]Obtained from (Saulnier et al., 1995) and (Yadav et al., 2007).
[c]Obtained from (Al-Assaf et al., 2005).
[d]Obtained from (Doublier & Launay, 1981) and (Dakia et al., 2008).

TABLE 2

Water holding capacity of psyllium husk powder in presence of 1% of soluble polysaccharides.

| Sample | Water holding capacity (g water held/g psyllium) |
|---|---|
| Psyllium only | 45.715 (1.434) |
| Psyllium + 1% MD | 44.597 (0.526) |
| Psyllium + 1% CBFG | 38.307 (0.623) |
| Psyllium + 1% GA | 41.264 (1.500) |
| Psyllium + 1% LBG | 35.652 (0.662) |

Values are averages of triplicates. The numbers in parentheses indicate standard deviations.

We claim:

1. A method of decreasing the viscosity of an aqueous suspension of a water insoluble or sparingly soluble dietary fiber, said method comprising combining said dietary fiber with water and corn bio-fiber gum.

2. The method according to claim 1, wherein said dietary fiber is psyllium seed husk.

3. The method according to claim 1, wherein said corn bio-fiber gum is mixed simultaneously with said dietary fiber in water.

4. The method according to claim 1, wherein said corn bio-fiber gum is mixed in water for about 30 minutes to about 24 hours and subsequently said dietary fiber is added.

5. A composition comprising at least one water insoluble or sparingly soluble dietary fiber and corn bio-fiber gum.

6. The composition according to claim 5, wherein said composition is produced by combining said water insoluble or sparingly soluble dietary fiber with water and corn bio-fiber gum.

7. The composition according to claim 5, wherein said at least one water insoluble or sparingly soluble dietary fiber is selected from the group consisting of psyllium seed husk, dietary fiber gel, cellulosic arabinoxylan fiber, insoluble biomass gel, beta glucan, and mixtures thereof.

8. The composition according to claim 5, wherein said at least one water insoluble or sparingly soluble dietary fiber is psyllium seed husk.

9. A method for processing psyllium husk particles, wherein said method comprises including corn bio-fiber gum in the water used for washing said psyllium husk particles thereby reducing the swelling of said psyllium husk particles.

* * * * *